INVENTORS.
SHIRLEY B. BROUSE and
JACK J. DALTON
By Donald H. Dalton
Attorney

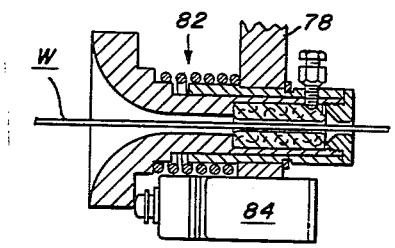
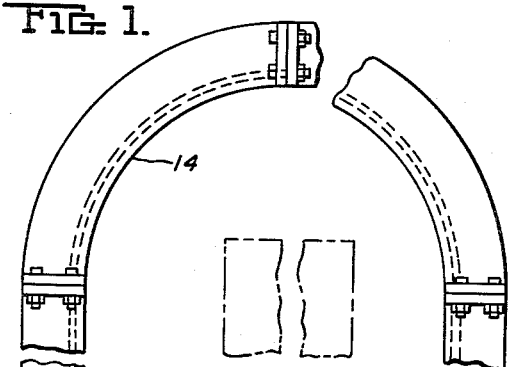
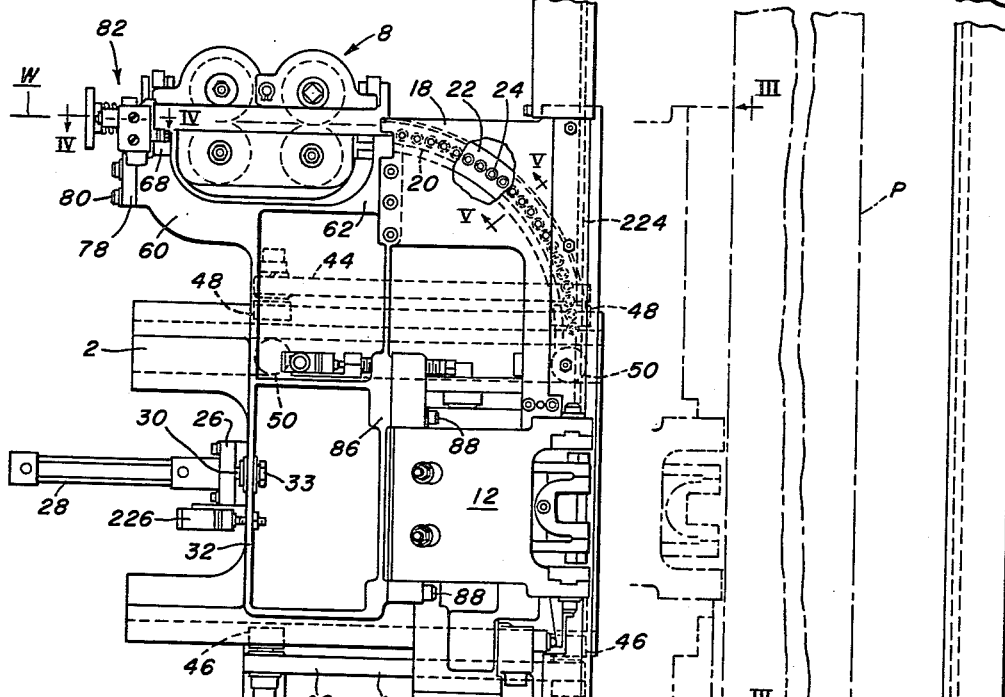
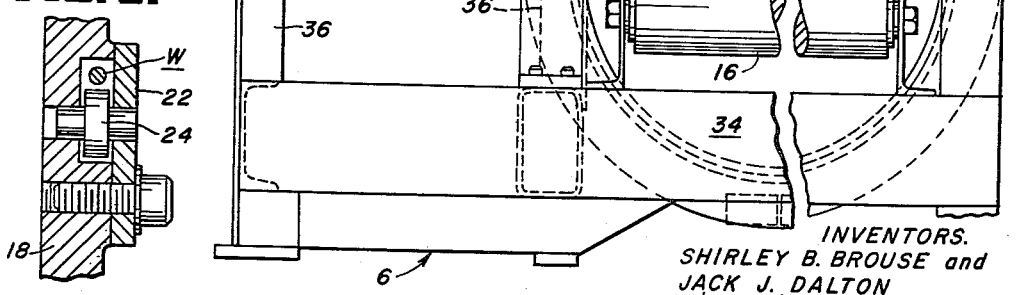
INVENTORS.
SHIRLEY B. BROUSE and
JACK J. DALTON
By Donald G. Dalton
Attorney

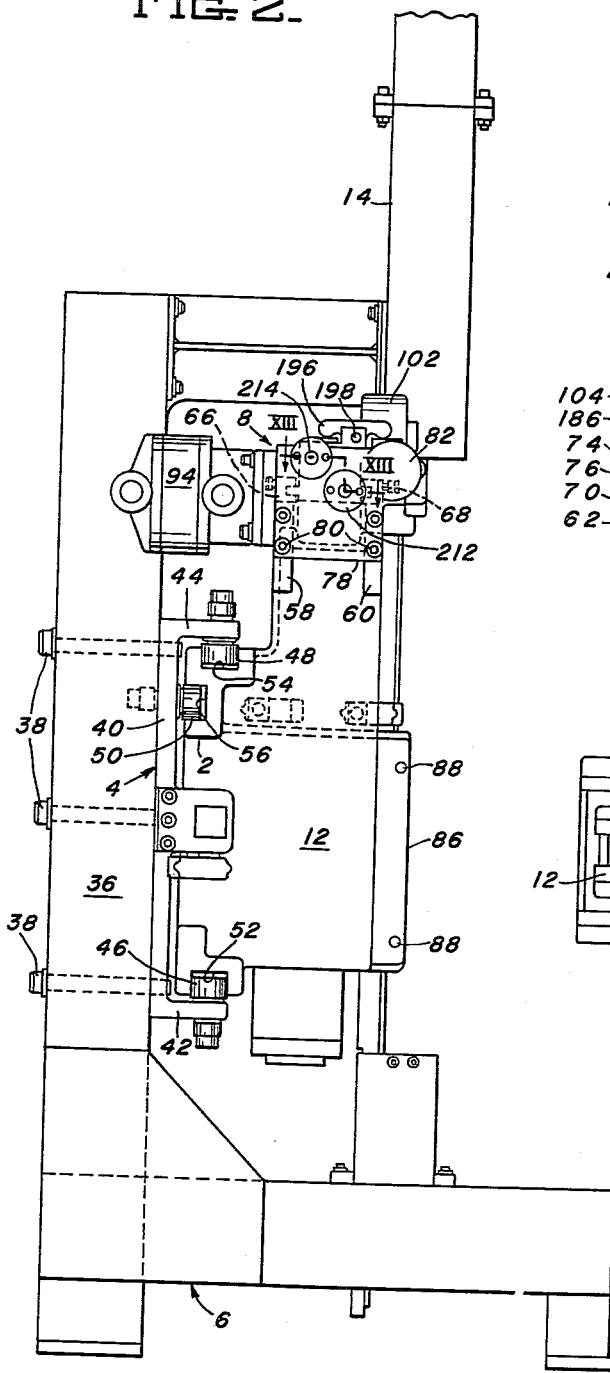
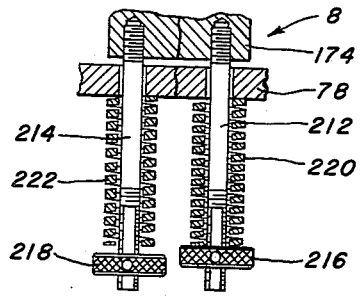
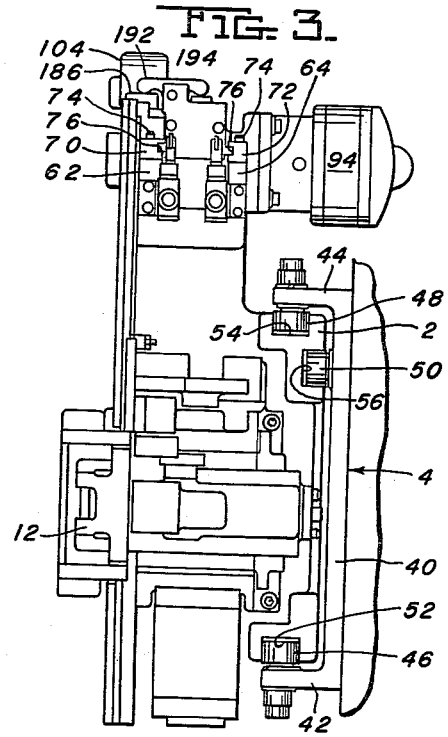

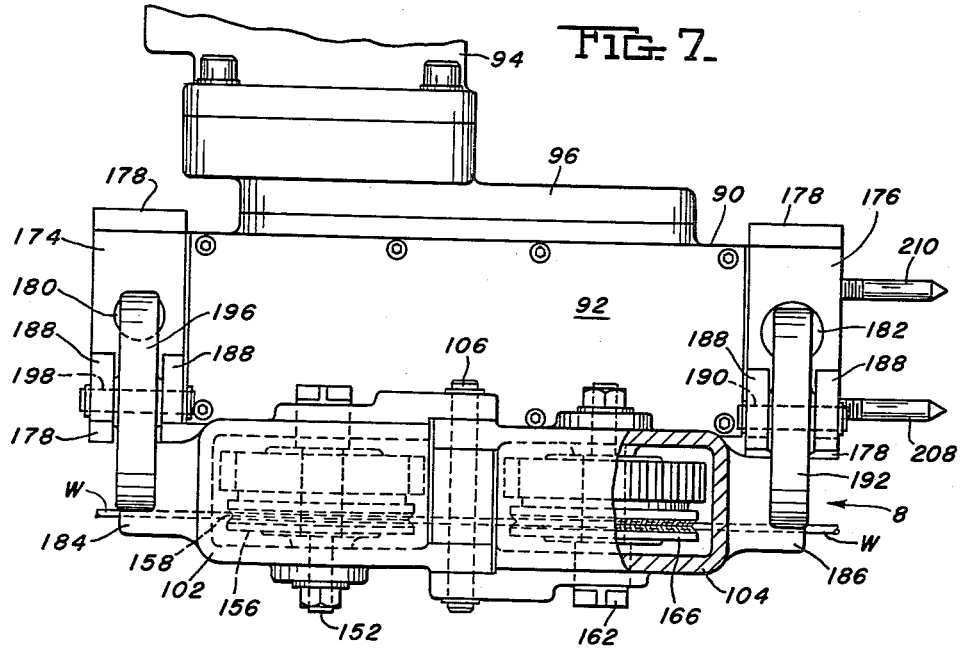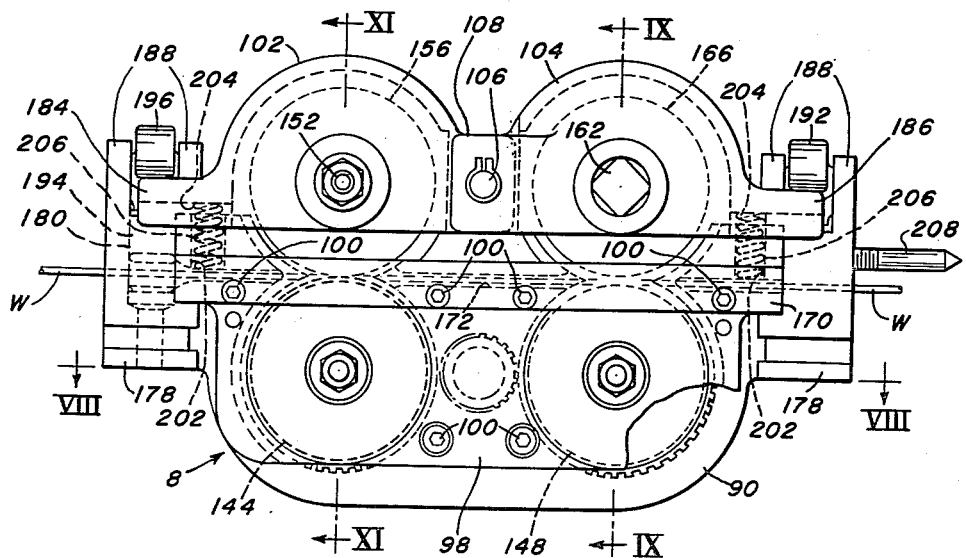

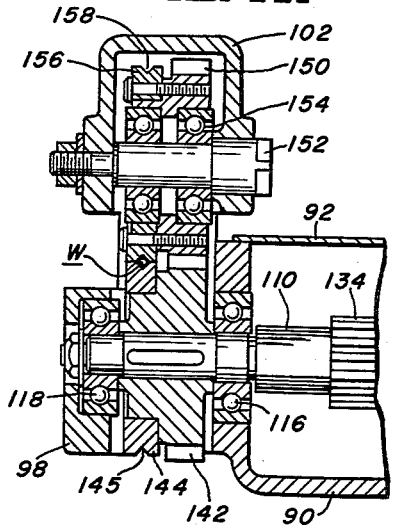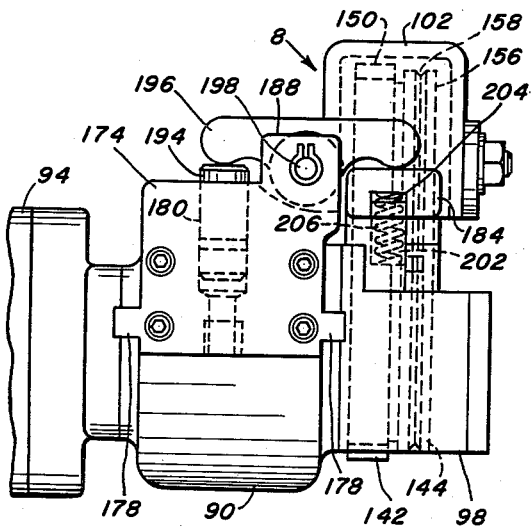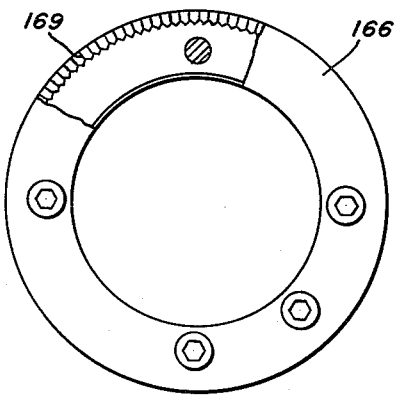

United States Patent Office 3,118,584
Patented Jan. 21, 1964

3,118,584
FEED-TENSION MECHANISM FOR AUTOMATIC
STRAPPING MACHINE
Shirley B. Brouse, Oak Lawn, and Jack J. Dalton, Olympia Fields, Ill., assignors to United States Steel Corporation, a corporation of New Jersey
Filed Aug. 6, 1962, Ser. No. 215,058
9 Claims. (Cl. 226—143)

The present invention relates generally to automatic machines for applying a strap to a bundle or package, tightening it therearound and securing lapped ends of the strap together to form a joint or tie. An example of such a machine is disclosed by Brouse et al. Patent No. 2,912,099. In the operation of this type of strapping machine, supply wire, from which a tie is to be made, is fed around a guide track in the form of a loop with the ends of the wire overlapped in the knotter mechanism of the machine. Then, when strapping is to be applied to a package, the package is placed within the track and the wire is retracted to draw it tight around the package. The overlapped ends of the wire are then twisted together by a twister pinion of the knotter mechanism after which the tie is cut free from the supply wire and ejected from the pinion.

The improvements claimed herein relate to the means for feeding the wire around the guide track and subsequently pulling it from the guide track into engagement with the bundle or package. Other parts of the machine, such as the knotter mechanism and guide track may be of any suitable construction. These elements are not claimed herein and shown diagrammatically or in detail only to an extent necessary for a clear understanding of the the present invention.

The novel features of the feed-tension mechanism of our invention, as herein described and claimed, may be employed in any known automatic strapping machine of the same general type as the above-mentioned Brouse et al. machine.

It is, accordingly, the primary object of our invention to provide an improved feed-tension mechanism adapted to be installed in an automatic strapping machine for initially feeding strap into the machine and then subsequently retracting the strap to draw it taut around a bundle or package.

It is another object of our invention to provide an improved feed-tension mechanism which includes a pair of reversible driven feed rolls, a pair of tension rolls and gearing connecting the pair of feed rolls and the pair of tension rolls whereby the feed rolls are driven at high speed and low torque and the tension rolls are driven at relatively low speed and high torque.

As a corollary to the object immediately above, it is a further object of our invention to provide a unique pivotal roll housing arrangement whereby the driving force exerted on the strap can be shifted from high speed and low torque to low speed and high torque or vice versa without the use of a clutch or similar element.

It is another object of our invention to provide a tension roll having a peripheral groove with a serrated surface for receiving the wire whereby a swedging action is exerted on the wire so that it is engaged without "nicking" and other weakening effects.

These and other objects will become more apparent after referring to the following specification and attached drawings, in which:

FIGURE 1 is a front elevational view of a wire tying machine having the feed-tension mechanism of the invention installed therein;

FIGURE 2 is an end elevational view looking at the left side of FIGURE 1;

FIGURE 3 is an elevational view taken along the line III—III of FIGURE 1;

FIGURE 4 is a longitudinal sectional view taken along the line IV—IV of FIGURE 1;

FIGURE 5 is a cross-sectional view taken along the line V—V of FIGURE 1;

FIGURE 6 is a front elevational view of the feed-tension mechanism of the invention;

FIGURE 7 is a plan view of FIGURE 6;

FIGURE 11 is a vertical-sectional view taken along the line XI—XI of FIGURE 6;

FIGURE 12 is an end elevational view looking at the left side of FIGURE 6;

FIGURE 13 is a partial longitudinal sectional view taken along the line XIII—XIII of FIGURE 2; and FIGURE 14 is an elevational view partly in section of the tension roll of the invention.

Figure 8:
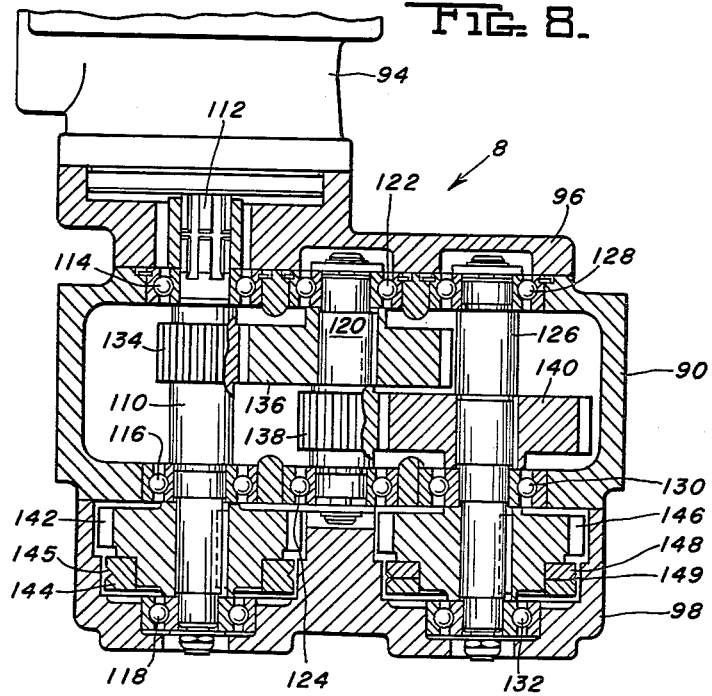
FIGURE 8 is a cross-sectional view taken along the line VIII—VIII of FIGURE 6.

Referring now in detail to the drawings and, for the present more particularly to FIGURES 1, 2 and 3 the principal working parts of the machine there shown are mounted on a carriage 2 which is mounted for linear movement in a horizontal plane on an upright support plate 4 which in turn is secured to a supporting frame 6 of structural members at one side thereof. These working parts include the feed-tension mechanism or unit of the invention, indicated generally by reference numeral 8, for feeding in tie wire W from an external supply coil (not shown) and retracting it to draw it taut, and a knotter mechanism or head 12. Other working parts of the machine include an upright, substantially annular guide track 14 and a conveyor 16 both mounted on the supporting frame 6. The conveyor 16 functions to carry a package P, to which a wire tie is to be applied, into the guide track and also serves as a support platform for the package while the tie is being applied. A vertically disposed plate 18 having a groove 20 therein covered by a cover plate 22 is connected at one end with the upper portion of the carriage 2 adjacent one end of the feed-tension mechanism 8 and at its lower end to the knotter head 12. The groove 20 in plate 18 serves to guide the wire W between the feed-tension unit 8 and the knotter head 12. Rollers 24 are provided in the groove 20 to facilitate movement of the wire therethrough.

A bracket 26 is attached to one edge of the support plate 4 and supports a hydraulic cylinder 28 having a piston rod 30 projecting therefrom. The projecting end of the piston rod 30 is attached to a rib 32 of the carriage 2 by means of a shoulder screw 33. The hydraulic cylinder 28 serves to move the carriage 2 toward and away from the conveyor 16.

Supporting frame 6 has a bed portion 34 which supports the guide track 14 and conveyor 16. Support plate 4 is secured to two upright members 36 of the frame 6 by means of screws 38. Support plate 4 is of channel section formed with a web 40, a lower flange 42 and an upper flange 44.

The carriage 2 is mounted on the plate 4 by means of a pair of rollers 46, journaled in the flange 42 and spaced one adjacent each end thereof; a pair of rollers 48, journaled in the flange 44 and spaced one adjacent each end thereof; and a pair of rollers 50, journaled in the web 40 and spaced one at each end of the web adjacent the upper flange 44. As best shown in FIGURES 2 and 3, the axes of rollers 46 and 48 are normal to the plane of respective flanges 42 and 44 while the axes of rollers 50 are normal to the web 40. The carriage 2 is provided with ways 52, 54, and 56 for receiving the pairs of carriage-support rollers 46, 48 and 50, respectively. Thus, the rollers 46, 48 and 50 support the carriage 2 vertically and horizontally. This arrangement makes it possible for the carriage 2 and the elements carried thereby to be positioned vertically, as shown, or horizontally, or angularly, as desired, so as to be suitable for a wide range of package-tying operations.

The carriage 2 is provided at the upper portion of one end with a pair of spaced upwardly projecting ribs 58 and 60. Corresponding ribs 62 and 64 are provided at the upper portion of the opposite end of the carriage. The ribs 58 and 60 support grooved blocks or gibs 66 and 68, respectively, while ribs 62 and 64 support gibs 70 and 72, respectively. Each of the gibs is secured to its respective supporting rib by means of screws 74 and is provided with a groove 76 in which the feed-tension unit 8 is slidably mounted, as will be more fully explained.

A vertical plate 78 is attached to the outer ends of the ribs 58 and 60 by means of screws 80 and bridges the space between the ribs. A spring-loaded eyelet assembly 82 is fitted in a hole in the plate 78 for receiving the wire W. A power shut-off switch 84 is mounted on the plate 78 adjacent the eyelet 82 and is adapted to be tripped by the eyelet 82 to shut off power to the machine if a snag or kink is encountered in the wire W entering the eyelet.

The knotter head 12 is secured to an upstanding flange or rib 86 on the carriage 2 by means of screws 88.

As already pointed out, the novel features disclosed in detail and claimed herein are those forming parts of the feed-tension mechanism 8 which will now be described.

Referring now to FIGURES 6 through 12, reference numeral 90 designates the transmission case of the feed-tension unit 8. Case 90 houses the gearing of the feed-tension unit and is capped with a removable cover plate 92. A reversible hydraulic motor 94 for driving the feed-tension unit is mounted on the rear face of the case 90 by means of a motor-mount plate 96. A fixed roll-support housing 98 is rigidly mounted on the forward face of the transmission case 90 by means of screws 100. An upper feed-roll housing 102 and an upper tension-roll housing 104 are disposed above the fixed roll-support housing 98 pivotally mounted on a common pin 106 which extends through an upwardly projecting boss 108 of the fixed housing.

A power take-off shaft 110 is connected by one end to the shaft of the motor 94 by means of a splined coupling 112. Shaft 110 projects from the coupling 112, extends through the transmission case into the roll-support housing 98, and is journaled in anti-friction bearings 114 and 116 in the rear wall and front wall, respectively, of the transmission case 90 and in anti-friction bearings 118 in the fixed roll-support housing 98. An idler or intermediate shaft 120 extends parallel with power shaft 110 in the case 90 and is journaled in anti-friction bearings 122 and 124. A drive shaft 126 is journaled in anti-friction bearings 128 and 130 in the case 90 parallel with idler shaft 120. Drive shaft 126 projects into the roll housing 98 where the end of the shaft is journaled in anti-friction bearings 132.

An integral pinion 134 on power shaft 110 meshes with a gear 136 fixed on idler shaft 120, and an integral pinion 138 on shaft 120 meshes with a gear 140 on shaft 126. Thus, power is transmitted from the motor 94 to the shaft 110 and to the drive shaft 126 for rotating the feed rolls and the tension rolls of the unit 8, as will become apparent.

Gears 142 and 146, each having a reduced diameter hub on one side thereof, are keyed to the ends of shafts 110 and 126, respectively, in the roll-support housing 98. A lower feed-roll 144 having a V-groove 145 extending around its periphery is fixedly mounted on the hub of gear 142 and a lower tension-roll 148 having a V-groove 149 around its periphery is fixedly mounted on the hub of the gear 146. Rolls 144 and 148 each have an outside diameter smaller than the pitch diameter of its respective gear, as best shown in FIGURES 8, 9, 10, 11 and 12.

As shown in FIGURE 11, a gear 150 having a hub on its forward face is rotatably mounted on a fixed shaft 152 in the pivotal upper feed-roll housing 102 by means of anti-friction bearings 154. An upper feed roll 156 having a V-groove 158 around its periphery is rigidly mounted on the hub of gear 150 in peripheral alignment with lower feed-roll 144. Peripheral groove 158 in upper feed-roll 156 matches with peripheral groove 145 in lower feed-roll 144 to form a restrictive passageway for wire W so that the wire is engaged and driving force is imparted thereto when the housing 102 and roll 156 carried thereby is pivoted toward the lower feed roll 144 journaled in the fixed roll-support housing 98.

Figure 9:
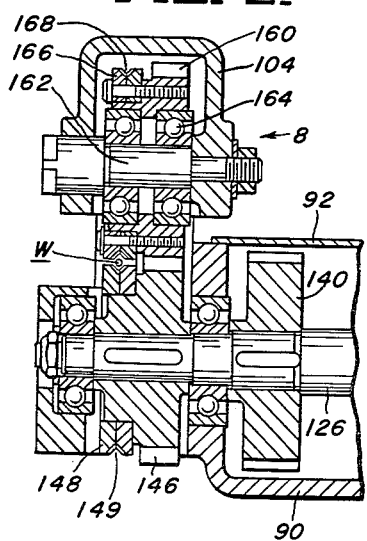
FIGURE 9 is a vertical-sectional view taken along the line IX—IX of FIGURE 6.
Figure 10:
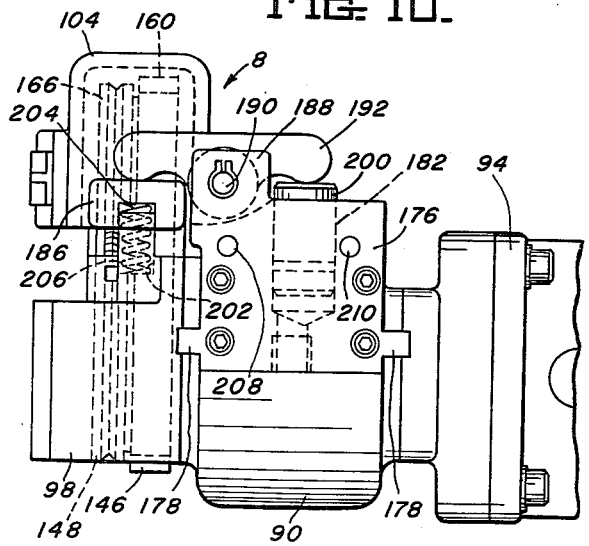
FIGURE 10 is an end elevational view looking at the right side of FIGURE 6.

Referring now to FIGURES 6 and 9, pivotal upper tension-roll housing 104 contains a gear 160 rotatably mounted on a fixed shaft 162 by means of anti-friction bearings 164. An upper tension-roll 166 having a peripheral V-groove 168 is rigidly mounted on a hub on the forward face of gear 160 in peripheral alignment with lower tension roll 148. Groove 168 is provided with a serrated surface and matches with groove 149, which is also provided with a serrated surface, in lower tension-roll 148 to form a restrictive passageway for engaging and driving the wire W when the pivotal housing 104 and the upper tension roll 166 carried thereby are pivoted toward the lower tension roll 148 journaled in housing 98.

As shown in FIGURE 14, the serrations 169 formed in the peripheral V-groove 168 of upper tension roll 166 and the peripheral V-groove 149 of lower tension roll 148 are relatively shallow and blunt. This construction causes the wire to be swedged between the serrations and eliminates "nicking" and consequent weakening of the wire when it is engaged between the upper and lower tension rolls. Although we have shown tension rolls 148 and 166 as being split, it will be noted that they are so designed to facilitate their construction and machining. If desired, they could be constructed as an integral unit.

A guide bar 170 having a longitudinal groove 172 extending along one face thereof is mounted on the front face of the fixed roll support 98 and functions to retain wire W in a guided path between the upper and lower feed and tension rolls.

Guide blocks 174 and 176 are rigidly attached to respective ends of the transmission case 90 and are each provided with laterally extending ribs or keys 178. The keys 178 mate with the grooves 76 in the gibs 66, 68, 70 and 72 so as to permit the feed tension unit 8 to slide on the carriage 2 between the upwardly projecting pairs of ribs 58, 60 and 62, 64.

Guide blocks 174 and 176 also serve to house hydraulic cylinders 180 and 182, respectively. Pivotally mounted housings 102 and 104 are formed with flanges 184 and 186, respectively. Flange 184 extends adjacent guide block 174 while flange 186 extends adjacent the guide block 176. Pairs of spaced ears 188 project upwardly from blocks 174 and 176. The ears 188 on block 176 house a pin 190 therebetween on which is pivotally mounted a rocker clamp 192. One end of the rocker clamp 192 extends to a point above the projecting end of the piston rod 200 of the hydraulic cylinder 182 and its other end extends over the flange 186 of housing 104. A rocker clamp 196 is similarly mounted on a pin 198 extending between the ears 188 of the guide block 174. One end of the clamp 196 extends over the projecting end of the piston rod of hydraulic cylinder 180 while its other end extends over the flange 184 of the housing 102. A recess 202 is provided in the upper surface of roll support 98 adjacent each end thereof each of which mates with similar recesses 204 in the flanges 184 and 186. A compression spring 206 is provided in each pair of mating recesses for constantly urging the pivotally mounted housings 102 and 104 away from the fixed roll-support housing 98. Actuation of the cylinder 180 will cause its piston rod 194 to be projected to pivot rocker clamp 196 downwardly against the flange 184 of housing 102 so as to cause the housing 102 and feed roll 156 carried thereby to be pivoted toward the lower feed roll 144. Actuation of cylinder 182 will similarly cause the upper tension roll 166 to be pivoted against the lower tension roll 148 by action of the rocker clamp 192.

As best shown in FIGURE 7, a pair of spaced switch-actuating pins 208 and 210 project from the guide block 176.

*Operation*

Before the start of an operating cycle to apply a tie around package P which has been moved into position within the track 14, wire W has been fed into the machine; driven through the knotter head and around the track with the leading end portion thereof overlapping, in the knotter head, a portion of the intially fed wire; and the leading end of the wire is positioned in a gripper (not shown) of the knotter head. During the tying cycle the following sequence of operations takes place in rapid succession:

(1) The gripper of the knotter is closed to grasp the leading end of the wire W.

(2) Hydraulic cylinder 28 is actuated to project piston rod 30 and move carriage 2 on the rollers 46, 48 and 50 against the package P.

(3) Hydraulic cylinder 180 is actuated and piston rod 194 thereof is projected against the end of rocker clamp 196 which causes the rocker clamp to pivot around the pin 198 and bear against the flange 184 of housing 102. This causes the feed-roll housing to pivot around pin 106 bringing the upper feed roll 156 downward against the lower feed roll 144 with the wire W engaged therebetween in the grooves 145 and 158.

(4) Motor 94 is energized causing the feed rolls 144 and 156 to turn in counterclockwise and clockwise directions, respectively, as viewed in FIGURES 1 and 6, to strip the wire out of the track at high speed and draw it around the package P.

As best shown in FIGURES 2 and 13, a pair of spaced pins or studs 212 and 214 affixed to the guide block 174 extend through the upright vertical plate 78 and have collars 216 and 218, respectively, adjustably threaded on the projecting ends thereof. A spring 220 encircles the stud 212 and bears against the collar 216 at one end and against the vertical plate 78 at its other end. A spring 222 is circumferentially disposed on the stud 214 between the collar 218 and the vertical plate 78. Spring 220 restrains travel of the feed-tension unit in the direction toward the guide track until the wire is drawn around the package P, at which time the tension exerted on the wire by the feed-rolls 144 and 156 causes the feed-tension unit to move forward and compress spring 220. Feed-tension unit 8 slides forward in the gibs 66, 68, 70 and 72 in the direction toward the guide track until the pin 208 strikes a switch (not shown) which relieves hydraulic cylinder 180 causing its piston rod 194 to be retracted by the action of spring 206 against flange 184 so that housing 102 is pivoted away from housing 98 and pressure on the wire by the feed rolls 144 and 156 is eliminated. At the same time hydraulic cylinder 182 is actuated to project piston rod 200 and pivot rocker clamp 192 to bear against flange 186 of housing 104. This action causes the housing 104 to pivot around the pin 106 so that upper tension roll 166 bears against the lower tension roll 148 and the wire W is engaged therebetween in the serrated V-grooves 149 and 168. The tension rolls 148 and 166 rotate at lower speed but at higher torque than the feed-rolls 144 and 156 because of the reduction pinions 134 and 138 and gears 136 and 140. Tension rolls 148 and 166 continue to retract the wire at slow speed but with increased pulling power until both springs 220 and 222 are compressed causing the feed-tension unit to advance further toward the guide track in the gibs in the carriage until the pin 210 actuates a switch (not shown) to stop the motor 94. After the motor 94 is stopped the wire remains engaged by the tension-rolls 148 and 146 in a tensioned grip.

It will be noted that collars 216 and 218 adjusted along the length of their respective studs 212 and 214 to vary the tension of springs 220 and 222 and thus vary the degree of tension to which the wire is tensioned before pin 210 actuates the switch to stop the motor 94.

The mechanism of the knotter head is now actuated to knot the wire and make the tie. At the end of the knotting operation, hydraulic cylinder 182 is relieved to permit housing 104 to be pivoted upwardly by the spring 206 bearing against the underside of flange 186. This causes the upper tension roll 166 to be removed from engagement with the wire W. After the tie has been made and the knot cut and ejected from the knotter head, cylinder 28 is energized to retract the piston rod 30 and move the carriage 2 back to its home position. When the carriage 2 is in home position, as shown by solid lines in FIGURE 1, a portion of the plate 18 having a vertical wire-accommodating groove 224 therein, and the knotter 12 are in vertical alignment with upper and lower vertical sections of the guide track 14. When the carriage 2 reaches home position a switch 226 is closed to energize cylinder 180 so that piston rod 194 is projected and rocker clamp 196 is pivoted to bear against the flange 184, resulting in the wire W being engaged by the feed rolls 144 and 156. Hydraulic motor 94 is then energized to rotate the feed rolls 144 and 156 in clockwise and counter-clockwise direction, respectively, as viewed in FIGURES 1 and 6, and feed the wire into the knotter mechanism and around the track in preparation for the next tying operation.

Although we have shown and described the feed-tension mechanism of our invention as being used with round wire strapping, it will be understood that it can also be used to feed and tension other types and shapes of metallic and non-metallic strapping.

While one embodiment of our invention has been shown and described, it will be apparent that other adaptations and modifications may be made without departing from the scope of the following claims.

We claim:

1. In a strapping machine, a reversible driven strap feeding and tensioning apparatus for feeding strap to said machine and thereafter retracting and tensioning the strap previously fed into said machine, said apparatus comprising a casing, a lower feed roll journaled in said casing, a lower tension roll journaled in said casing peripherally aligned with said lower feed roll, a first roll housing mounted on said casing for pivotal movement toward and away from said lower feed roll, an upper feed roll journaled in said first roll housing and adapted to cooperate with said lower feed roll when said first roll housing is pivoted toward said lower feed roll, a second roll housing mounted on said casing for pivotal movement toward and away from said lower tension roll, an upper tension roll journaled in said second roll housing and adapted to cooperate with said lower tension roll when said second roll housing is pivoted toward said lower tension roll, means for selectively pivoting said housings toward said lower feed roll and said lower tension roll, and reversible power means connected with said lower feed roll and said lower tension roll for driving the same.

2. Apparatus as defined by claim 1 in which resilient means are interposed between each of said housings and said casing for constantly urging said housings away from said casing.

3. Apparatus as defined by claim 1 in which said first and second roll housings are mounted about a common pivot point, said housings are each provided with a flange, the flange of said first housing extending along said casing toward one end thereof and the flange of said second housing extending along said casing toward the opposite end thereof, a rocker clamp is pivotally mounted adjacent each end of said casing adapted to engage one of said flanges to thereby pivot one of said housings toward said casing, and power means are connected with each of said rocker clamps for pivoting the same.

4. Apparatus as defined by claim 1 in which said power means includes a reversible motor, and a power shaft connecting said motor with said lower feed roll.

5. Apparatus as defined by claim 4 including a gear train connecting said power shaft and said lower tension roll whereby the latter is driven simultaneously with said lower feed roll but at a lower speed and higher torque than said lower feed roll.

6. Apparatus as defined by claim 5 in which said gear train comprises a pinion fixedly mounted on said power shaft, an idler shaft journaled adjacent to and parallel with said power shaft, a gear fixedly mounted on said idler shaft and being in mesh with said pinion, a pinion fixedly mounted on said idler shaft, a drive shaft journaled adjacent to and parallel with said idler shaft, said drive shaft being fixedly connected at one end with said lower tension roll for driving the same, and a gear fixedly mounted on said drive shaft and being in mesh with said pinion on said idler shaft.

7. Apparatus as defined by claim 6 including a gear fixedly mounted on one face of each of said lower feed and said lower tension roll and each of said upper feed and said upper tension roll, each of said last-named gears having a diameter greater than the diameter of the respective roll on which said gear is mounted, the gear on said lower feed roll being in mesh with the gear on said upper feed roll and the gear on said lower tension roll being in mesh with the gear on said upper tension roll.

8. Apparatus as defined by claim 1 in which the peripheries of said lower feed roll and said upper feed roll are formed with matching grooves extending therearound, and the peripheries of said lower tension roll and said upper tension roll are formed with matching grooves extending therearound, said matching grooves being adapted to engage a wire between said lower and upper feed rolls and between said lower and upper tension rolls.

9. Apparatus as defined by claim 8 in which said matching grooves in the peripheries of said lower tension roll and said upper tension roll have dull serrated surfaces for positively swedging and gripping said wire.

References Cited in the file of this patent
UNITED STATES PATENTS

| | | |
|---|---|---|
| 1,096,857 | Federquist | May 19, 1914 |
| 2,613,706 | Smith | Oct. 14, 1952 |
| 2,754,958 | Murrell et al. | July 17, 1956 |
| 2,813,435 | Schumb | Nov. 19, 1957 |